Figure 1:
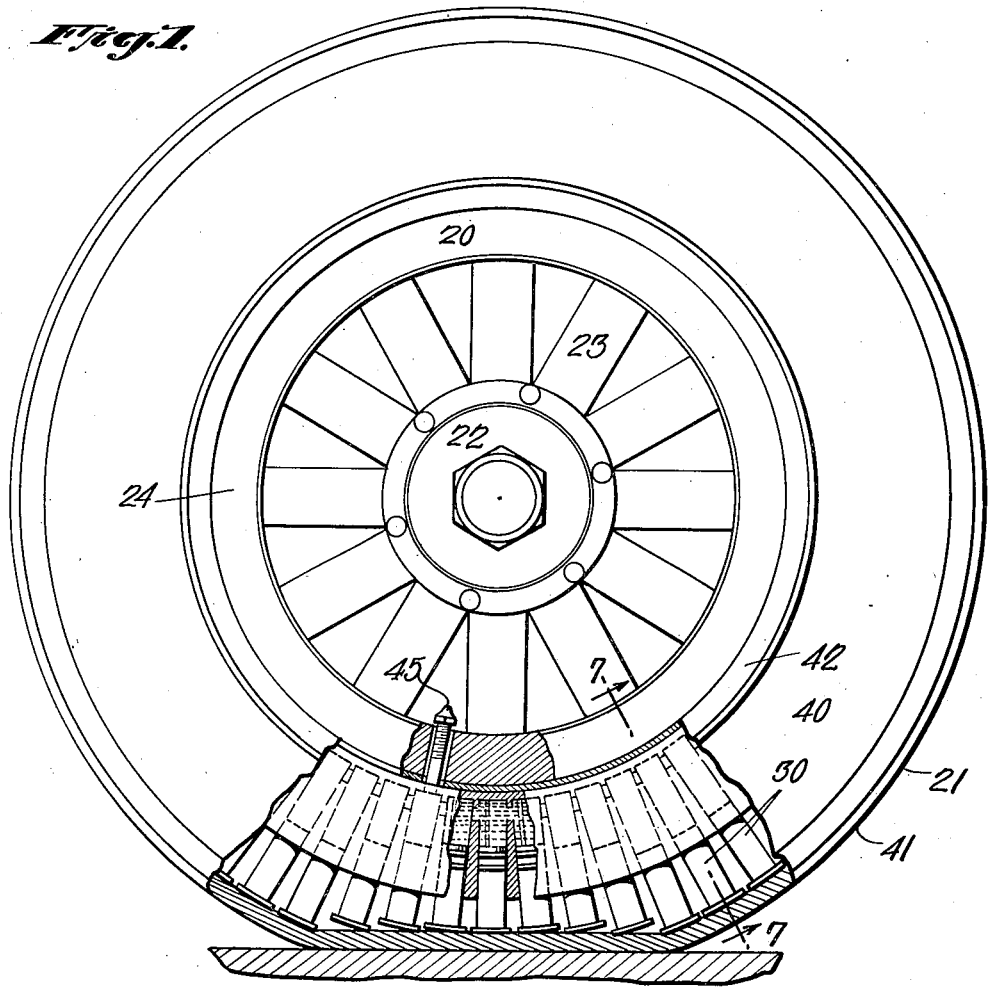

July 5, 1932.  W. A. MARTIN  1,866,476
HYDRAULIC WHEEL
Filed Sept. 5, 1930   3 Sheets-Sheet 1

Inventor
WILLIAM A. MARTIN.
By Clarence A. O'Brien
Attorney

July 5, 1932. W. A. MARTIN 1,866,476
HYDRAULIC WHEEL
Filed Sept. 5, 1930 3 Sheets-Sheet 2
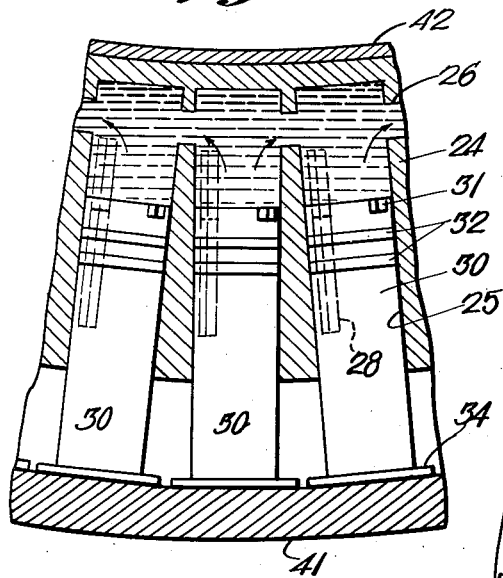
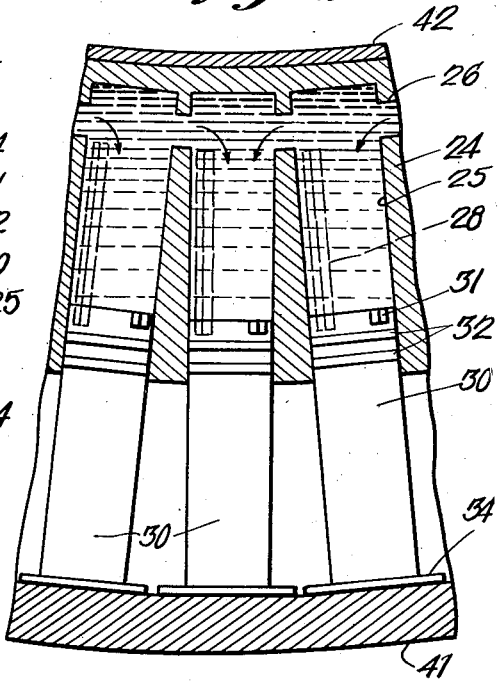
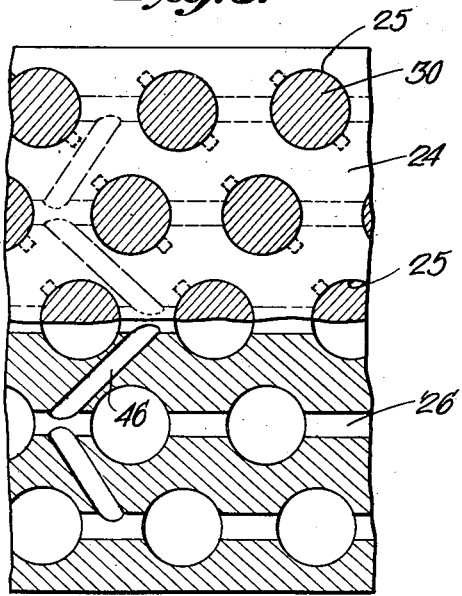
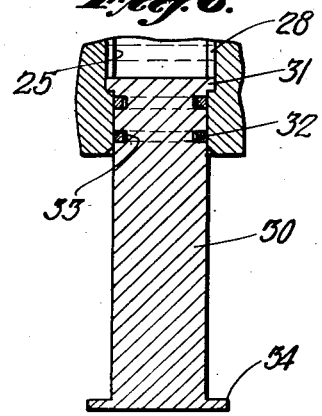
Inventor
WILLIAM A. MARTIN.
By Clarence A O'Brien
Attorney July 5, 1932. W. A. MARTIN 1,866,476
HYDRAULIC WHEEL
Filed Sept. 5, 1930   3 Sheets-Sheet 3
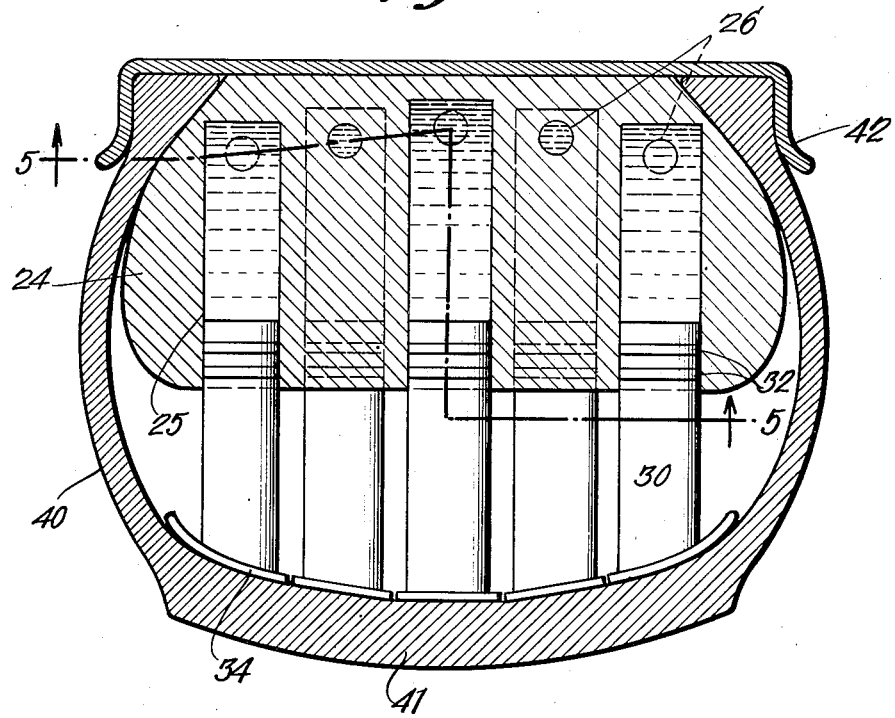
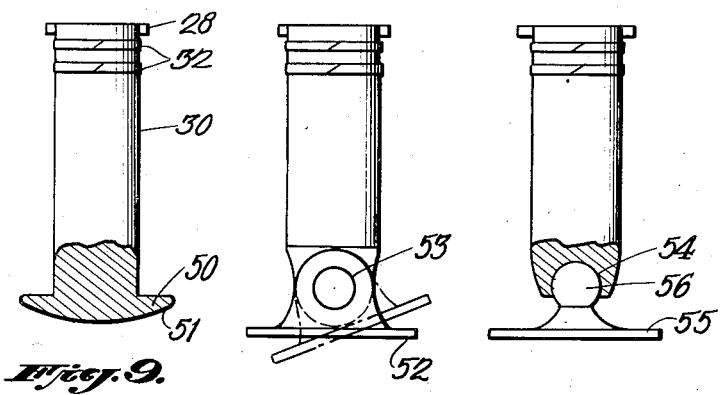
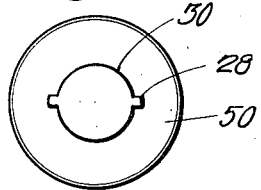
Inventor
WILLIAM A. MARTIN.
By *Clarence A. O'Brien*
Attorney Patented July 5, 1932

1,866,476

UNITED STATES PATENT OFFICE

WILLIAM A. MARTIN, OF BROOKLYN, NEW YORK

HYDRAULIC WHEEL

Application filed September 5, 1930. Serial No. 479,972.

The present invention relates to new and useful improvements in wheels, and more particularly it pertains to wheels of the cushion type.

It is an object of the present invention to provide a novel wheel in which the cushioning effect is obtained by a fluid, which fluid however is confined against escape even though the tire of the wheel become punctured.

It is a further object of the invention to provide a novel structure whereby a wheel of the above type may be provided with a tread member of a flexible nature and preferably formed of rubber, whereby in use, the tread of the wheel may conform to inequalities of the roadway and at the same time provide a cushioning effect for the vehicle which is supported by the wheel.

Other objects of the invention relate to certain novel and improved constructions, arrangements and combinations of parts hereinafter described and particularly pointed out in the claims, the advantages of which will be readily understood and appreciated by those skilled in the art.

The invention will be clearly understood from the accompanying drawings illustrating the invention in its preferred form, and the following detailed description of the construction therein shown.

Figure 2:
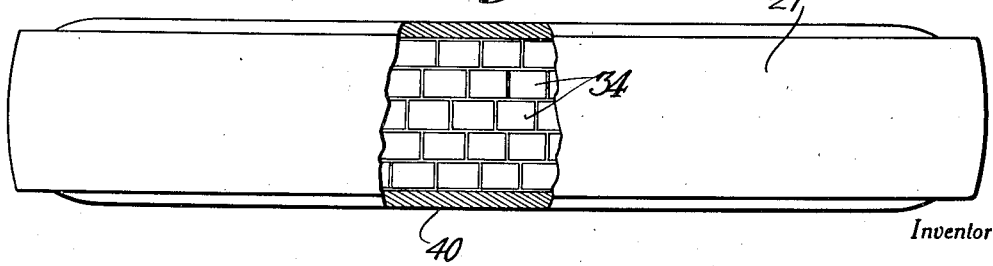

Referring to the drawings,

Figure 1 is a view partly in side elevation and partly in section of a wheel constructed in accordance with the present invention, Figure 2 is a plan view of the tread of a wheel constructed in accordance with the present invention, a portion of the tread being broken away, Figure 3 is a detail circumferential section showing the plungers of the wheel in their fully depressed or inward position, Figure 4 is a similar view showing the plungers fully extended, Figure 5 is a detail sectional view taken on the line 5—5 of Figure 7, Figure 6 is a detail sectional view illustrating the construction of the several plungers, and the manner in which they are fitted in the several cylinders, Figure 7 is a transverse sectional view taken on the line 7—7 of Figure 1, Figure 8 is a detail sectional view of a slightly modified form of plunger, Figure 9 is an end view in detail of one of the cylinders, Figure 10 is a view in elevation of a still further modified form of plunger, and;

Figure 11 is a view partly in elevation and partly in section of a still further modified form of the invention.

Referring to the drawings by reference character, 20 designates an inner wheel, and 21 designates the outer tread member. The inner wheel member preferably consists of a hub 22 having spokes 23, and a felloe or the like 24.

The felloe member 24, is provided with a plurality of elongated cylindrically shaped recesses 25, and as best illustrated in Figure 5, these cylinder recesses 25 are staggered transversely of the tread of the wheel. As also illustrated in Figure 5, these cylindrical recesses 25 are arranged in circumferentially extending series, and each circumferentially extending series has communication with the adjacent series for a purpose to be hereinafter described.

As best illustrated in Figures 4 and 6, each of the cylinders is provided with diametrically opposed grooves such as 28. As also illustrated by these figures, pistons such as 30 are adapted for sliding movement in each of the cylinder recesses 25, and each piston has projections or the like 31 which are adapted for engagement in the grooves 28 to prevent turning or rotary movement of the pistons 30 in their respective cylinder recesses 25. To provide for a fluid tight joint between the several pistons and the walls of their respective cylinder, rings 32 are provided, and these rings are preferably of the resilient type and seated in recesses 33 in the pistons 30. Each of the pistons 30 is provided with an enlarged portion 34 which forms a head for the piston, or a foot therefor for engagement with the outer tread member 21 during operation of the wheel.

The outer tread member 21, as more clearly illustrated in Figure 7 comprises a shoe or the like 40 having a thickened tread portion 41. The shoe 40 may be retained in position upon the inner wheel member 20 by a suitable channel member 42, in the manner similar to the means commonly employed for attaching pneumatic tires to wheels, and as best illustrated in said Figure 7, the enlarged portions 34 of the several pistons engage the inner face of the thickened portion 41 of the outer tread member 21.

The several cylinders 25 are adapted to be filled with a suitable fluid such as a heavy oil, and for this purpose, a valve 45 may be provided. This valve communicates with one of the cylinder recesses, and oil is introduced therethrough. As oil is introduced through the valve to one of the cylinder recesses, it will flow into all of the cylinder recesses by way of the circumferentially extending passages 26, and the transversely extending passages 46, which connect the circumferentially extending series of cylinders in order that oil or other fluids may be introduced into all of said cylinder recesses 25 and the several passages 26 through a single valve.

While I have stated that the several cylinders are filled with fluid, it is to be understood that the entire interior of the fluid chamber is not filled with fluid and that there will be sufficient space provided to permit of movement of the several pistons and displacement of the fluid from one cylinder to another as the several pistons successively take the weight of the vehicle during travel of the wheel over the road.

In Figure 8, there is illustrated a slightly modified form of piston head, and in this form, the piston head is designated 50, and is formed with a curved outer face 51 adapted for engagement with the inner face of the shoe member 21.

In Figure 10, there is illustrated a still further modified form of piston, and in this form, the head or shoe of the piston, is designated 52, and is illustrated as pivotally mounted as at 53, in the end of the piston.

In Figure 11, a slightly modified form of the piston is provided with a sperical shaped recess 54, and the head or shoe member 55 is provided with a ball or the like 56 adapted to be received within the recess 54 in order that the head or shoe 55 may have universal movement relative to the piston.

The device operates in the following manner.

As the wheel is rotated in contact with the roadway surface, the several pistons act to compress and displace the oil or other fluid, and the load will be supported upon those pistons which are at the bottom of the wheel or at the point of contact with the roadway, and the oil under compression behind said pistons. As the pistons successively assume the lower most position as illustrated in Figure 1, the pistons which pass away from said lower most position will be extended by reason of the fluid displaced under pressure by the pistons in the lower most position, this insuring a proper contour to the wheel. Cushioning effect is had by reason of the fact that the fluid is somewhat restricted in its passage from one cylinder to another by the pistons as their heads successively engage the road surface, and the extent of cushioning effect will be determined by the size of these passages and their consequent action on the fluid in its passage therethrough.

From the foregoing, it will be apparent that the present invention provides a novel form of cushion wheel in which the weight of the load is carried resiliently or in a cushioned manner upon a fluid which is displaced successively into a plurality of cylinders during operation of the wheel.

Having thus described the invention, what is claimed as new and desired to secure by Letters Patent of the United States, is:

1. In a wheel of the character specified, an inner tire member having a plurality of radially extending cylinders and ports adjacent the inner portions of the cylinders to provide restricted communication between the cylinders, an outer tire member having pistons extending into said cylinders, and a liquid partially filling said cylinders and movable thru the cylinders.

2. In a wheel of the character specified, an inner tire member having a plurality of radially extending cylinders and ports adjacent the inner portions of the cylinders to provide restricted communication between the cylinders, an outer tire member having pistons extending into said cylinders, and a liquid partially filling said cylinders and movable thru the cylinders, said cylinders being arranged in staggered relation transversely of the thread of the tire.

In testimony whereof I affix my signature.
WILLIAM A. MARTIN.